No. 743,824.

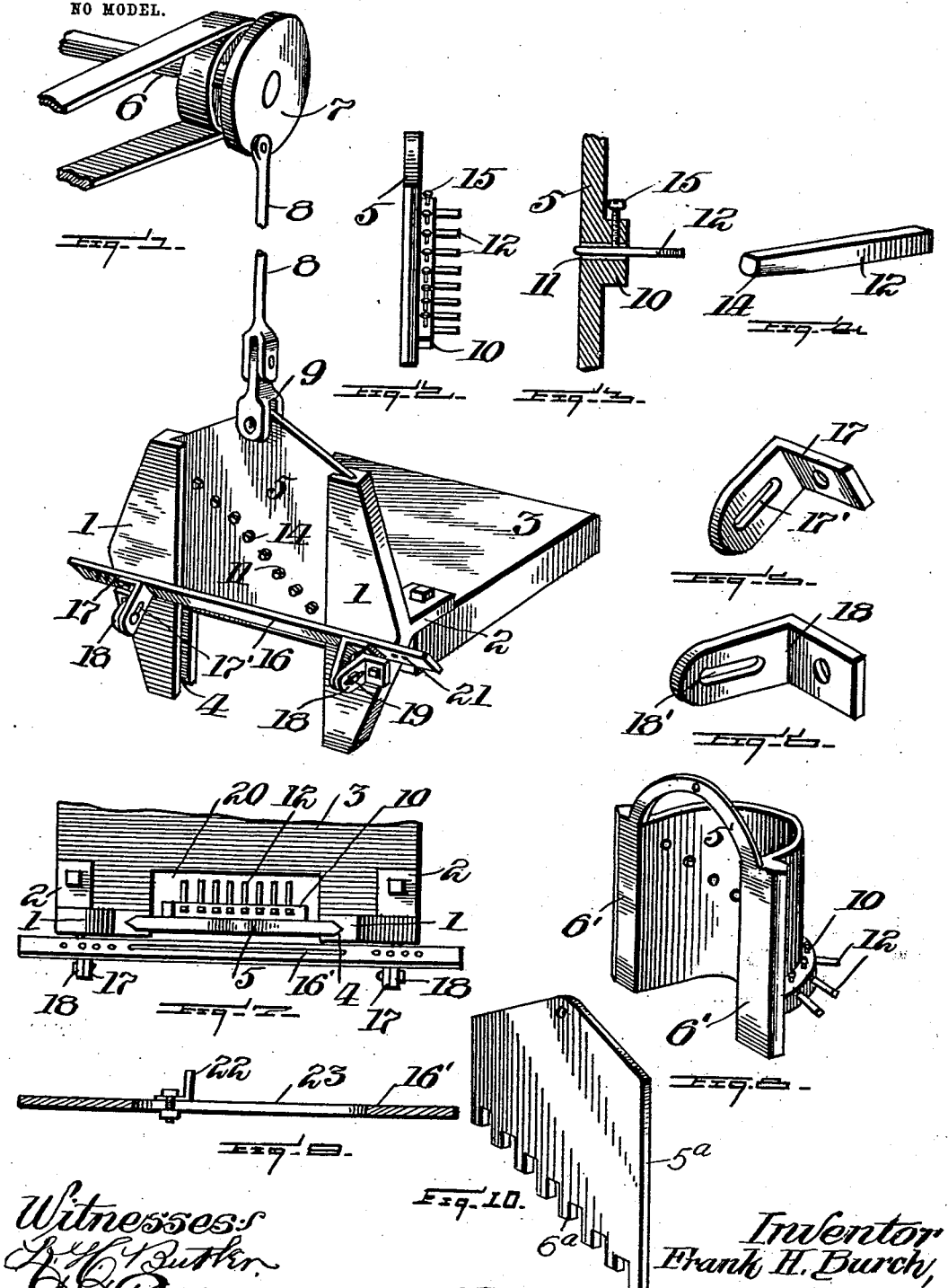

Patented November 10, 1903.

UNITED STATES PATENT OFFICE.

FRANK H. BURCH, OF ALLEGHENY, PENNSYLVANIA, ASSIGNOR, BY MESNE ASSIGNMENTS, TO WILLIAMSPORT MIRROR AND GLASS COMPANY, OF WILLIAMSPORT, PENNSYLVANIA, A CORPORATION OF PENNSYLVANIA.

GLASS-CHIPPING MACHINE.

SPECIFICATION forming part of Letters Patent No. 743,824, dated November 10, 1903.

Application filed February 19, 1903. Serial No. 144,151. (No model.)

*To all whom it may concern:*

Be it known that I, FRANK H. BURCH, a citizen of the United States of America, residing at Allegheny, in the county of Allegheny and State of Pennsylvania, have invented certain new and useful Improvements in Glass-Chipping Machines, of which the following is a specification, reference being had therein to the accompanying drawings.

This invention relates to certain new and useful improvements in glass-chipping machines, and has for its object the provision of novel means whereby a glass plate may be chipped at one or more points at a single stroke of the chipper, greatly facilitating this class of work and cheapening the cost of the same.

In the construction of mirrors, glass signs, and other articles of a like nature it is a common practice to "chip" the edge of the glass plate in such a manner as to impart a wavy and ornamental appearance to the article being produced. Heretofore and before my invention it has been the practice to do this by scoring the plate on one face adjacent to the edge thereof with a diamond and then employ a hand-tool somewhat in the form of a pair of nippers to chip off the pieces of the glass plate to impart the wavy effect desired to the glass. This work as heretofore practiced has not only been tedious and slow, but unless the greatest care was exercised the chipped out portions would be of different sizes and the desired effect would therefore be spoiled. Furthermore, it required an operator of considerable skill and experience to prevent cracking and consequent damage to the plate of glass being worked upon. With my improved machine all this difficulty heretofore experienced is obviated, and the rapidity with which the work may be accomplished is greatly facilitated, besides assuring the chipped or cut-away sections being of uniform size throughout, and the danger of injuring the plate being operated upon is reduced to a minimum.

In order to enable those skilled in the art to practice the invention, reference will be had in the accompanying description to the drawings herewith, and wherein like numerals of reference will be employed to designate like parts throughout the different views, in which—

Figure 1 is a detail perspective view of my improved machine, showing the same mounted on a bench or like support and connected up to an overhead shaft for driving. Fig. 2 is a side elevation of the cutter-head. Fig. 3 is a transverse vertical sectional view of the same, partly broken away. Fig. 4 is a detail perspective view of one of the bits or cutters. Fig. 5 is a detail perspective view of one of the brackets attached to the plate-rest. Fig. 6 is a like view of one of the brackets carried by the guides for the cutter-head. Fig. 7 is a top plan view showing the supporting-bench broken away. Fig. 8 is a detail perspective view of a modified form of cutter-head, which may be employed for the chipping of substantially oval form glass plates. Fig. 9 is a longitudinal sectional view of a part of the plate-rest, showing a modified form of construction, which is provided with an adjustable stop for the glass plate. Fig. 10 is a detail perspective view of another modified form of cutter-head.

My invention resides in a vertically-reciprocating cutter-head carrying a series of cutters, bits, or chippers which are so arranged in the cutter-head as to successively engage with the glass plate being chipped during the descent of the cutter-head, each cutter forming one chip or notch in the plate, the latter being supported in an inclined position on a rest arranged in front of the cutter-head.

The machine may be mounted in any suitable manner and may also be driven by any suitable means to impart the vertically-reciprocatory movement to the cutter-head. As my invention has been practiced by me I have mounted the machine directly upon a workbench, along the front edge thereof, and drive the same by a pitman connected with overhead shafting. As this is a practical arrangement I have illustrated the same in the accompanying drawings.

To construct the machine, I provide a pair of guides 1, which where the device is to be mounted in the manner I have stated and shown in the accompanying drawings are each provided with a bracket 2, apertured to receive a bolt or like means, by which the guides are securely fastened to the bench 3. These guides 1 are provided on their inner edges with guideways 4 to receive the edges of the vertically-reciprocatory cutter-head 5, which operates therein. The guideways I have in practice preferably made V-shaped, and the edge of the cutter-head will consequently be constructed accordingly to fit the guideways; but this is not essential, and these guideways may be of any desired form, as well as the edges of the cutter-head. As the invention has been practiced by me I have driven the cutter-head by means of a driven overhead shaft 6, carrying a crank-disk 7, to which is pivotally connected the upper end of a pitman 8, having its lower end bifurcated and pivotally connected to a clevis 9, that is in turn pivotally connected to the upper end of the cutter-head centrally thereof. This manner of connecting the pitman to the cutter-head allows the free working of the pitman without bringing any strain or pull thereof against the cutter-head. This cutter-head is provided on its rear face with a bushing or enlargement 10, which extends at an angle across the said rear face from a point at or near one upper corner thereof to a point at or near the opposite lower corner. Through this enlargement or bushing and through the cutter-head is a series of openings 11, which in practice I have preferably made round and which receive the cutters, bits, or chippers 12. These cutters or bits I preferably make square in cross-section, whereby when they are inserted in the round holes 11 the edges of the cutters or bits engage the walls of the holes and liability of the cutters or bits turning in the holes is minimized. The cutters or bits at their forward ends are rounded off on the underneath face to form the chipping-points 14 of the bits, these chipping-points projecting slightly beyond the front face of the cutter-head and the bits extending at an angle across the face of the cutter-head, as seen in Fig. 1, the lowermost bit being adjacent to one lower corner of the head and the uppermost bit being adjacent to the opposite upper corner of the cutter-head. The bits are securely held in position by means of set-screws 15, arranged in the enlargement or boss 10, one set-screw for each bit.

The glass plate to be chipped is supported in front of the cutter-head with the edge of the glass plate resting against the face of the cutter-head, and for supporting the plate I provide an adjustable rest 16, comprising a bar or plate, to which is attached a pair of angle-brackets 17, that are in turn secured to a pair of angle-brackets 18, attached to the guides 1. The brackets 17 are provided with slots 17' and the brackets 18 with slots 18', and through these slots are passed set-screws or bolts 19. By loosening the set-screws or bolts 19 the rest 16 may be adjusted to give the same any inclination desired and the depth of the chip made in the glass plate being operated upon thereby varied. Where the device is mounted upon a work-bench, as illustrated, clearance for the projecting ends of the bits or cutters may be provided by cutting away a part of the work-bench, as shown at 20 in Fig. 7, or the brackets 2 may be attached to the bench in such a manner as to afford the desired clearance. In order to provide for longitudinal adjustment of the rest 16, I preferably provide the same with a series of holes 21 and connect the brackets 17 by means of bolts or set-screws. I may also employ a stop for the end of the glass plate being operated upon to rest against where a series of plates all of the same size are being chipped. To this end I may provide a slotted rest 16', such as shown in Figs. 7 and 9, the adjustable stop 22 being held by a bolt or set-screw operating through the slot 23 in said rest. When the proper position for the glass plate on the rest and in front of the cutter-head has been determined, the stop 22 may be set, so that the ends of the plates can be brought against the stop, thus relieving the operator of the care of seeing that the plate is always positioned exactly where the cutters will each engage the same.

In Fig. 10 I show a form of cutter-head 5ª, the lower edge of which is on an incline and which is notched to form stepped chipping teeth or bits 6ª, which successively engage with the glass and chip out the sections thereof in the same manner as is accomplished by the bits carried by the plate in the forms shown in Figs. 1 and 8.

While I may and do employ the form of machine as above described and as shown in Figs. 1, 7, and 10 for the chipping of glass plates of an oval form, yet it will be observed that by reason of the edge of the plate being oval only one or perhaps two of the cutters may be employed on such form of plate. In order to form a series of chips or notches in an oval-shaped plate in the same manner as may be done in an oblong or square plate, I provide a cutter-head of the form shown in Fig. 8, the head 5' having extending guides 6' to work in the guideways in the guides 1. This form of cutter-head is provided on its rear face with an enlargement or boss, and the openings for the cutters or bits are through this boss and through the plate in the same manner as heretofore described. Likewise the cutters or bits extend at an angle across the face of the cutter-head and are held in their seats in the head in the same manner as described for the form of head shown in Fig. 1. Connection of the pitman with this form of cutter-head is made in any suitable manner. It is of course understood that with this form of cutter-head a support or rest conforming to the style of cutter-head will be employed.

In operation the glass plate to be chipped is placed on the rest 16, the latter having been adjusted to the desired inclination. When motion is imparted to the shaft 6, this shaft, through the media of the crank-disk and pitman, operates the cutter-head in a vertical manner, and as the same descends the bits engage and notch or chip out the plate, the bits successively engaging the plate, so that only one bit is engaging the plate at once, obviating the danger of cracking the plate, which would be occasioned were all the bits to strike it at the same time. As the last bit passes the plate and as the cutter-head ascends the operator simply turns the plate with the opposite edge in position to be chipped as the cutter-head again descends. The bits being of uniform size, and each therefore engaging an equal amount of surface of the glass plate, the notches or chips cut in the plate are uniform throughout, besides being clean cut, with no rough or ragged edges, as is the case where the part is chipped out by a hand-tool. Where the adjustable stop 22 is employed, it will be observed that the care required to be exercised by the operator is reduced to a minimum, as after the stop has been set and a series or quantity of plates all of the same size are to be chipped the one side edge or one end of the plate is simply placed against the stop, assuring the proper positioning of the plate to be engaged by the cutters or bits.

While I have herein shown and described at length the invention in detail as it is practiced by me, yet I do not wish to unduly limit myself to the exact construction shown and described, as it will be observed that in the practice of the same various changes may be made in the details of construction without departing from the general spirit of my invention.

Having fully described my invention, what I claim as new, and desire to secure by Letters Patent, is—

1. In a machine of the class described, the combination with the guides, and an adjustable rest for the plate to be chipped, of a vertically-reciprocatory cutter-head, means for imparting a reciprocatory movement to said head, and a series of cutters or bits carried by the head and arranged to successively engage the plate to be chipped, substantially as described.

2. In combination with the guides, and a support therefor, a vertically-reciprocating cutter-head, means for reciprocating said cutter-head, and a series of cutters or bits carried by the cutter-head and extending at an angle across the face of the same, substantially as described.

3. In a glass-chipping machine, the combination with a suitable support, of a vertically-reciprocatory cutter-head, means for operating said cutter-head, and a series of bits or cutters carried by said head and extending at an angle across the face of the head whereby they successively engage the plate to be chipped, as the cutter-head descends, substantially as described.

4. In a glass-chipping machine, the combination with suitable supporting means, and an adjustable rest for the plate to be chipped, of a vertically-reciprocatory cutter-head, means for operating said cutter-head, and a series of adjustable cutters or bits carried by said head and extending at an angle across the face of the same, substantially as described.

5. In a glass-chipping machine, a pair of guides, a suitable support to which the guides are affixed, an adjustable rest supported from the guides, a vertically-reciprocatory cutter-head operating in said guides, means connected to the upper end of the cutter-head for reciprocating the same, and a series of cutters or bits arranged at an angle in said cutter-head across the face thereof, as and for the purpose described.

6. In a glass-chipping machine, the combination with supporting means for the plate to be chipped, of a vertically-reciprocatory cutter-head, means for operating said cutter-head, and a series of cutters or bits carried by said cutter-head and arranged to successively engage with the plate to be chipped, substantially as described.

7. In a glass-chipping machine, the combination with an adjustable rest for the plate to be chipped, of a vertically-reciprocatory cutter-head, means for operating said cutter-head, and a series of cutters adjustably mounted in the cutter-head and extending across the face thereof at an angle whereby they successively engage the plate being chipped as the cutter-head descends, and means for securing the cutters or bits in the adjusted position, substantially as described.

8. In a glass-chipping machine, the combination with an inclined rest for supporting the plate to be chipped, of a vertically-reciprocatory cutter-head, a series of cutters or bits carried by said head and arranged to successively engage the plate being chipped, and means for operating the cutter-head, substantially as described.

9. In a glass-chipping machine, the combination with an inclined rest for the plate to be chipped, of a reciprocatory cutter-head, a series of cutters or bits adjustably mounted in the cutter-head and extending at an angle across the face thereof, means connected to the cutter-head for reciprocating the same, substantially as described.

10. In a glass-chipping machine, the combination with a support for the plate to be chipped, of a reciprocatory cutter-head, a series of cutters carried by said head and being arranged out of horizontal alinement with each other, and means for operating the head, substantially as described.

11. In a glass-chipping machine, the combination with a rest or support for the plate to be chipped, an adjustable stop carried by said rest, of a vertically-reciprocatory cutter-head, a series of cutters or bits carried by said head, and means for operating said cutter-head, substantially as described.

12. In a glass-chipping machine, the combination with a vertically-reciprocating cutter-head, cutters carried by said head and means for reciprocating said head, of a rest for the plate to be chipped, said rest adjustable to different inclinations, as and for the purpose described.

13. In a glass-chipping machine, a vertically-reciprocating cutter-head, a series of cutters carried thereby, means for operating the cutter-head, and a rest or support for the plate to be chipped, said rest or support being adjustable longitudinally and to different inclinations, as and for the purpose described.

14. In a glass-chipping machine, a vertically-reciprocating cutter having chipping teeth or bits, means whereby said chipping teeth or bits are brought into engagement with the glass, one at a time, and means for supporting the glass in position to be engaged by said teeth or bits.

15. In combination with the guides, the glass-chipping means mounted therein and the means for operating the same, an adjustable inclined support.

16. In combination with the glass-chipping means, a pair of slotted brackets, a support, slotted brackets secured to said support, and a securing means engaging the slots of said brackets.

In testimony whereof I affix my signature in the presence of two witnesses.

FRANK H. BURCH.

Witnesses:
ADOLPH MAEULIN,
A. M. WILSON.